United States Patent [19]

Ashley

[11] Patent Number: 4,803,592

[45] Date of Patent: Feb. 7, 1989

[54] POWER CONTROL AND FAULT ISOLATION INDICATOR

[75] Inventor: Donald J. Ashley, Endicott, N.Y.

[73] Assignee: International Business Machines Corporation, Armonk, N.Y.

[21] Appl. No.: 146,132

[22] Filed: Jan. 19, 1988

Related U.S. Application Data

[63] Continuation of Ser. No. 877,857, Jun. 24, 1986, abandoned.

[51] Int. Cl.[4] .................................................. H02H 3/04

[52] U.S. Cl. .......................................... 361/79; 361/86; 361/87; 355/14 C; 371/29

[58] Field of Search ................. 355/14 C; 361/78, 79, 361/86, 89, 90, 91, 92, 93, 94, 87, 42, 47, 50; 371/16, 20, 29

[56] References Cited

U.S. PATENT DOCUMENTS

| | | | |
|---|---|---|---|
| 4,133,477 | 1/1979 | Marino et al. | 235/304 |
| 4,403,213 | 9/1983 | Khamare et al. | 340/517 |

FOREIGN PATENT DOCUMENTS 0024661 3/1981 European Pat. Off. .

*Primary Examiner*—A. D. Pellinen
*Assistant Examiner*—Jeffrey A. Gaffin
*Attorney, Agent, or Firm*—Milton M. Field; S. M. Beckstrand; M. H. Klitzman

[57] ABSTRACT

A power supply system, which supplies a number of different A.C. and D.C. voltage levels to a plurality of loads, is monitored at a number of points for undervoltage, overvoltage and/or overcurrent fault conditions. A diagnostics logic circuit, which is formed from relatively inexpensive, readily available logic units, generates a BCD code signal indicating a fault in response to the occurrence of a fault condition at one of the monitored points. The system responds to this BCD fault indicating code signal by, on the one hand, protecting the power system by actuating a main relay to open the A.C. power line to the system and generating a shutdown signal applied to a pulse width modulator of a converter in the system and, on the other hand, by driving a seven-segment display which displays a numeral to indicate the location of the fault condition. In order to avoid false undervoltage fault signals while the system voltages are coming up after the system is turned on, a delay circuit is used to mask the BCD code generating portion of the diagnostics logic until the system voltages reach normal operating levels.

12 Claims, 6 Drawing Sheets

NAND

| A1 | B1 | F1 |
|---|---|---|
| 0 | 0 | 1 |
| 0 | 1 | 1 |
| 1 | 0 | 1 |
| 1 | 1 | 0 |

AND

| A2 | B2 | F2 |
|---|---|---|
| 0 | 0 | 0 |
| 0 | 1 | 0 |
| 1 | 0 | 0 |
| 1 | 1 | 1 |

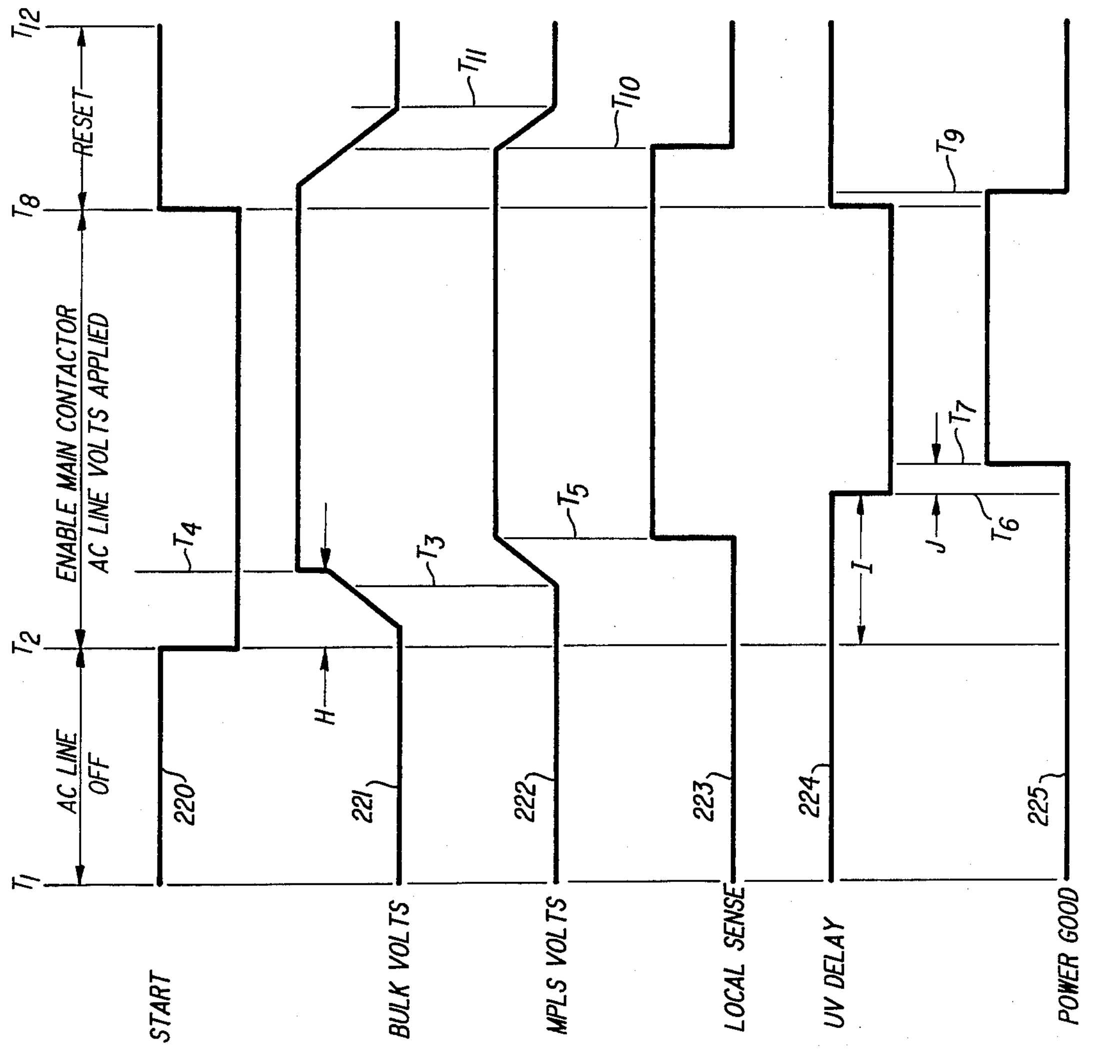
FIG. 5 POWER UP/DOWN SEQUENCE WITHOUT FAULTS

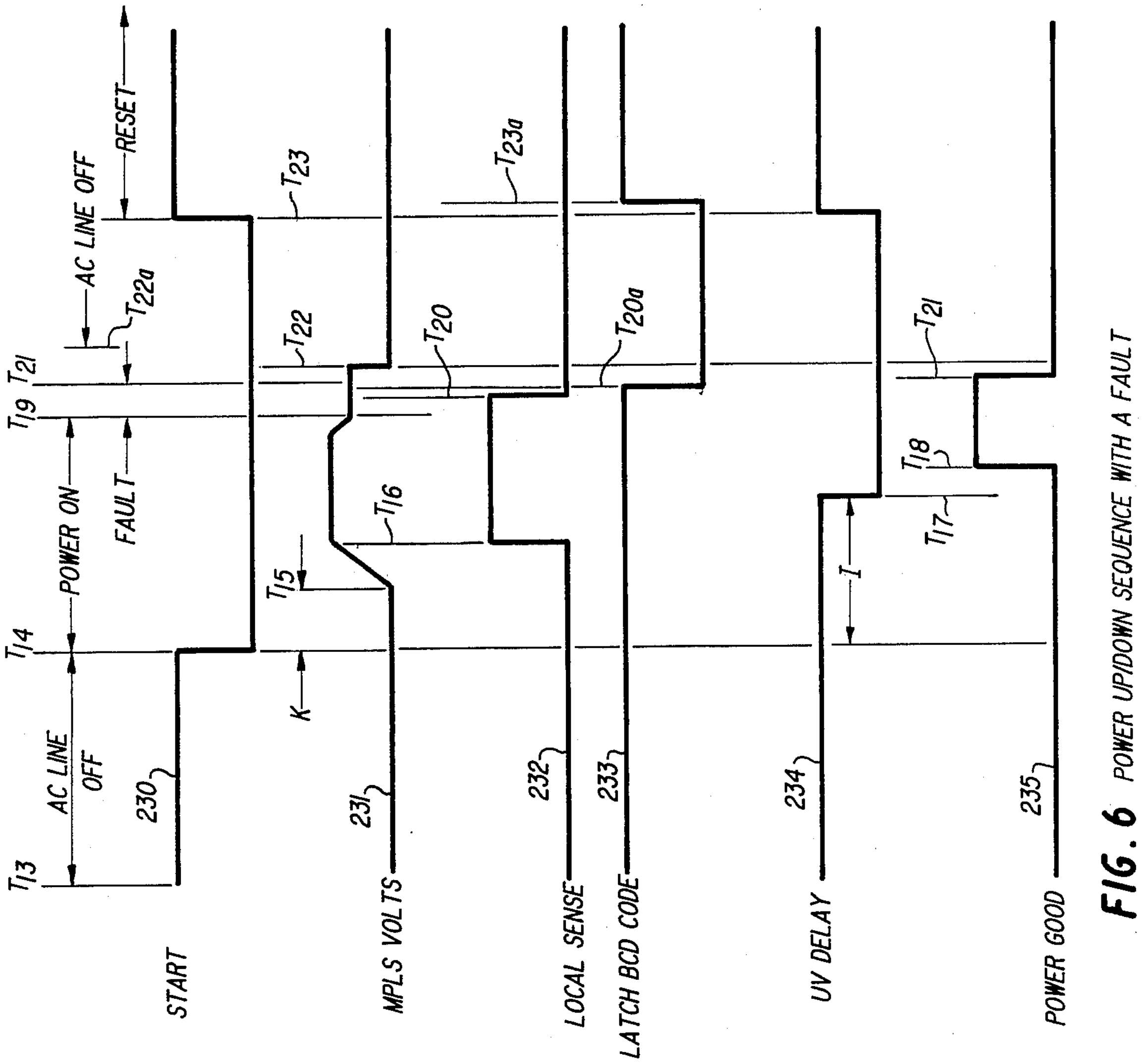
FIG. 6 POWER UP/DOWN SEQUENCE WITH A FAULT

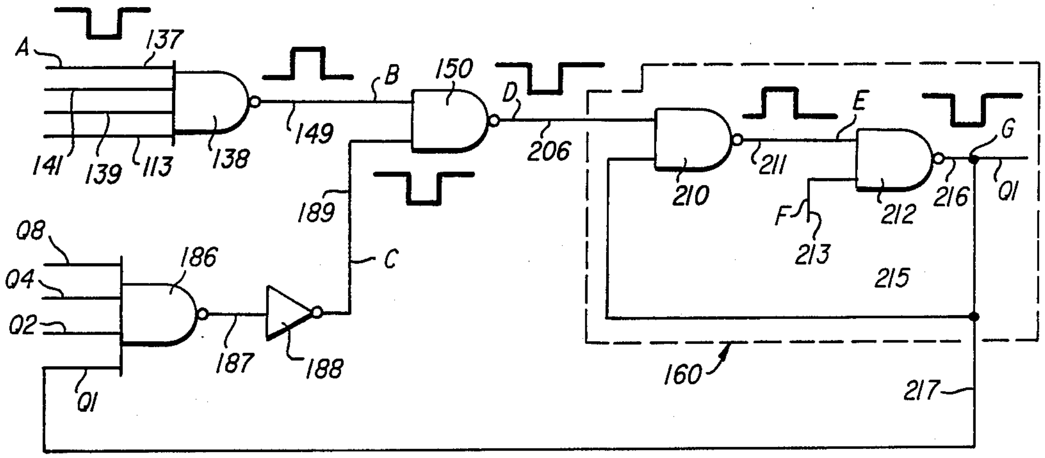
FIG. 7
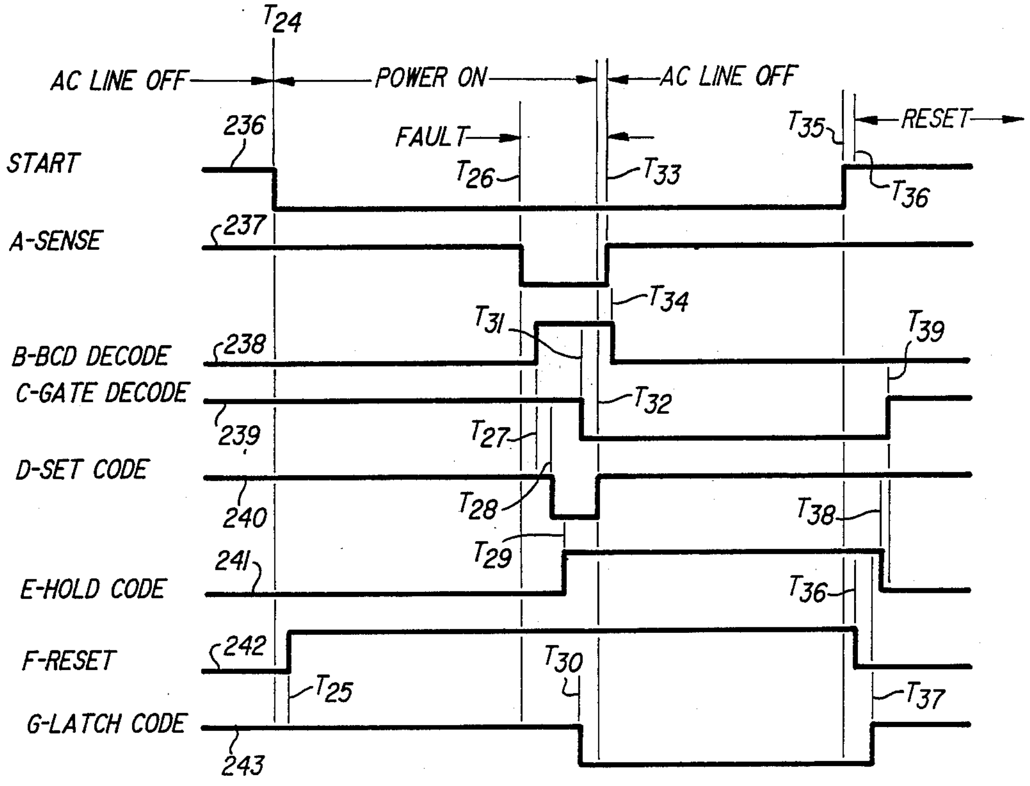
FIG. 8 FAULT CODE RETENTION

POWER CONTROL AND FAULT ISOLATION INDICATOR

This application is a continuation of application Ser. No. 877,857, filed June 24, 1986, now abandoned.

BACKGROUND OF THE INVENTION

1. Field of the Invention

This invention relates to power supplies and, more particularly, to power supplies having fault responsive means to protect the system from the consequences of a fault condition and indicator means for isolating the fault.

2. Brief Description of the Prior Art

When complex power supply systems which supply a number of different A.C. and D.C. voltage levels to a plurality of loads, such as are required by printers used as peripherals to computer systems, develope a fault condition (for example, an undervoltage, overvoltage or overcurrent condition in one of the subcircuits of the system), means are usually provided to protect the system, for example, by cutting off the A.C. power line to the system. It is then a difficult and time consuming task for a service technician in the field to locate the site and cause of the problem so that he may replace the field replaceable unit in which the problem resides.

Although there are a number of suggestions in the prior art of systems having means to indicate the location of faults or other conditions, none of these relate to isolating faults in complex power supply systems. In British Pat. No. 2,036,390, for example, each fault in a data processing system, such as a centrally controlled telephone exchange, sets a "1" bit into a shift register at a position appropriate to the faulty device's identity. When a central processor needs a fault report, it clocks a counter while sifting the register so that the bits appear at the rightmost stage. The processor samples each bit to decide if it is a "1". If not, another clock pulse implements the count, while the shift register shifts another bit to the rightmost edge. The process repeats until "1" is found. The count residing in the counter indicates which data processing system has failed.

U.S. Pat. No. 4,521,885 discloses a diagnostic display apparatus for an electro-mechanical system, such as, an electrical vehicle or lift truck, which senses and displays the condition of electro-mechanical components prior to and during machine operation. Sensors are mounted on the accelerator pedal and steering wheel to generate BCD signals representing the pedal position and steering wheel angle. Sensors also monitor operator panel switches which control the forward and reverse movement direction of the vehicle and a battery level detector showing the charge remaining on the vehicle battery. A software programmable processor generates a series of command signals guiding the serviceman in forming a series of tests. A diagnostic code is displayed when a faulty element is found.

U.S. Pat. No. 4,062,061 discloses a copying machine under the control of a CPU module. If an electromechanical component of the machine experiences some nature of operational difficulty, a fault flag is set in an error log. Display means visually identifies the fault location, and a permanent record is stored in memory for future use by a service technician.

U.S. Pat. No. 4,039,813 relates to apparatus and a method for diagnosing digital data devices. A counter is used to address an array in conjunction with bits set into a select register. The location of the array address indicates a section of a logical system selected to be tested. A large logic system may now be partitioned into smaller sections and a pre-programmed test may be applied to the individual sections for narrowing down a failure. The counter keeps track of which section of the logic system is under test so that the expected results from the test may be compared for accuracy.

Although these prior art devices are useful for isolating faults, they donot associate the fault isolation with means to shutdown the system for preventing further damage. None of these prior art systems isolate faults in a power supply system, and the fault isolation means used, employing shift registers and programmed processors, are relatively complex and expensive.

SUMMARY OF THE INVENTION

It is therefore the object of the invention to provide an improved power supply and fault isolation indicator which reduces the time required for fault isolation and which associates power supply protection means with fault isolation.

It is another object of the invention to provide a power supply and fault isolation indicator which employs readily available, simple, and relatively inexpensive logic components and which avoids the use of complicated and expensive microprocessors, programmable computers, or software support. The device of the invention may, therefore, be easily manufactured by non-professional employees or industrial robots with great cost savings. Because the logic of the system employs NAND logic gates, the device may be easily converted to E-VLSI (extra very large scale integration) with substantial reductions in the volumes of the circuitry.

Briefly, the power control and fault isolator of the invention includes logic circuit means which generates a fault indicating code signal in response to a fault condition at a point in the power supply system. The system responds to the fault indicating code signal by, on the one hand, protecting the power supply system by activating means to shut down the power supply system and, on the other hand, by driving an indicator displaying a decimal numeral or the like which indicates the location of the fault condition.

The power control and fault isolation indicator of the invention includes a plurality of sense lines, each corresponding to a point in a power supply system, one logic level on a sense line representing a normal condition at the corresponding point in the power supply system and a second logic level on a sense line representing a fault condition at the corresponding point. Logic circuit means is connected to the sense lines and is responsive to the second logic level on one of the sense lines for generating a code signal representing the corresponding point in the power supply system at which the fault condition occurred. Shutdown means is responsive to the code signal for shutting down the power supply system, and indicating means is responsive to the code signal for indicating the point in the power supply system at which the fault condition occurred. The logic circuit means includes latch means for storing the code signal, the shutdown means and indicating means being responsive to the code signal stored in the latch means.

The fault conditions monitored include undervoltage, overvoltage, and overcurrent conditions at various points in the power supply system. In order to avoid false undervoltage fault signals while the output voltage levels from the power supply system are ramping up, delay means, responsive to the start means for the power supply, masks or inhibits the logic circuit means to prevent generation of a fault code signal in response to an undervoltage condition until the output voltages reach normal operating levels.

The code signal is a BCD code signal and the system includes means for converting the BCD code signal to a seven segment indicator drive signal. A seven segment display is driven by the drive signal to display a character, such as a decimal numeral, representing the point at which the fault condition occurred.

The BCD code signal includes a plurality of binary digits which have an initial value in the absence of signals of the second logic level on all of the sense lines. The logic circuit means responds to the appearance of a second logic level on one of the sense lines to change the value of one or more of the plurality of binary digits to a fault value so that the BCD code signal has a value corresponding to a decimal number value signifying that a fault condition occurred at the point in the power supply system corresponding to the one of the sense lines.

In order to reduce the complexity of the system, several sense lines are grouped to be identified by one of the code signals. This reduces the cost of the logic circuit means, but with the tradeoff of an increase in the fault isolation time required by the service technician.

The logic circuit means of the invention includes for each BCD digit, a first logic gate for generating a BCD digit output signal of the fault value in response to a second value appearing on a corresponding sense line. A first NAND gate has an input receiving the BCD digit output signal and generates a set signal. The latch means comprises a second NAND gate and a third NAND gate. The second NAND gate has an input receiving the set signal from the first NAND gate and generates a hold signal applied to a first input of the third NAND gate to latch the BCD digit. A second logic gate has a plurality of inputs, one being connected to receive the latched BCD digit, and the remaining inputs being connected to receive the remaining latched BCD digits. The second logic gate generates a gate signal connected to a second input of the first NAND gate. A second input of the second NAND gate is connected to the output of the third NAND gate to receive the latched BCD digit, and a second input of the third NAND gate is connected to receive a reset signal which is generated upon the actuation of a start signal which turns on the power supply system.

The power supply system of the invention includes a main relay controlling a main switch for connecting the power supply system to an A.C. power line. The power supply further includes a D.C. to D.C. switching converter associated with a PWM modulator. The shutdown means responds to the code signal to actuate the main relay to open the main switch and thus disconnect the power supply from the A.C. power line and also applies a shutdown signal to the PWM modulator to substantially instantaneously disable the PWM modulator and converter means.

BRIEF DESCRIPTION OF THE DRAWINGS

These and other objects, features and advantages of the invention will be more fully appreciated with reference to the accompanying drawings, in which:

FIG. 5 is a timing diagram illustrating the operation of the power-up and down sequence in the absence of faults;

FIG. 6 is a timing diagram illustrating the operation of the power-up and down sequence with the presence of a fault;

FIG. 7 is a logic circuit diagram illustrating the latching of a BCD digit of the code signal of the invention; and FIG. 8 is a timing diagram illustrating the latching of the BCD digit in FIG. 7.

DETAILED DESCRIPTION OF THE PREFERRED EMBODIMENT

Figure 1:
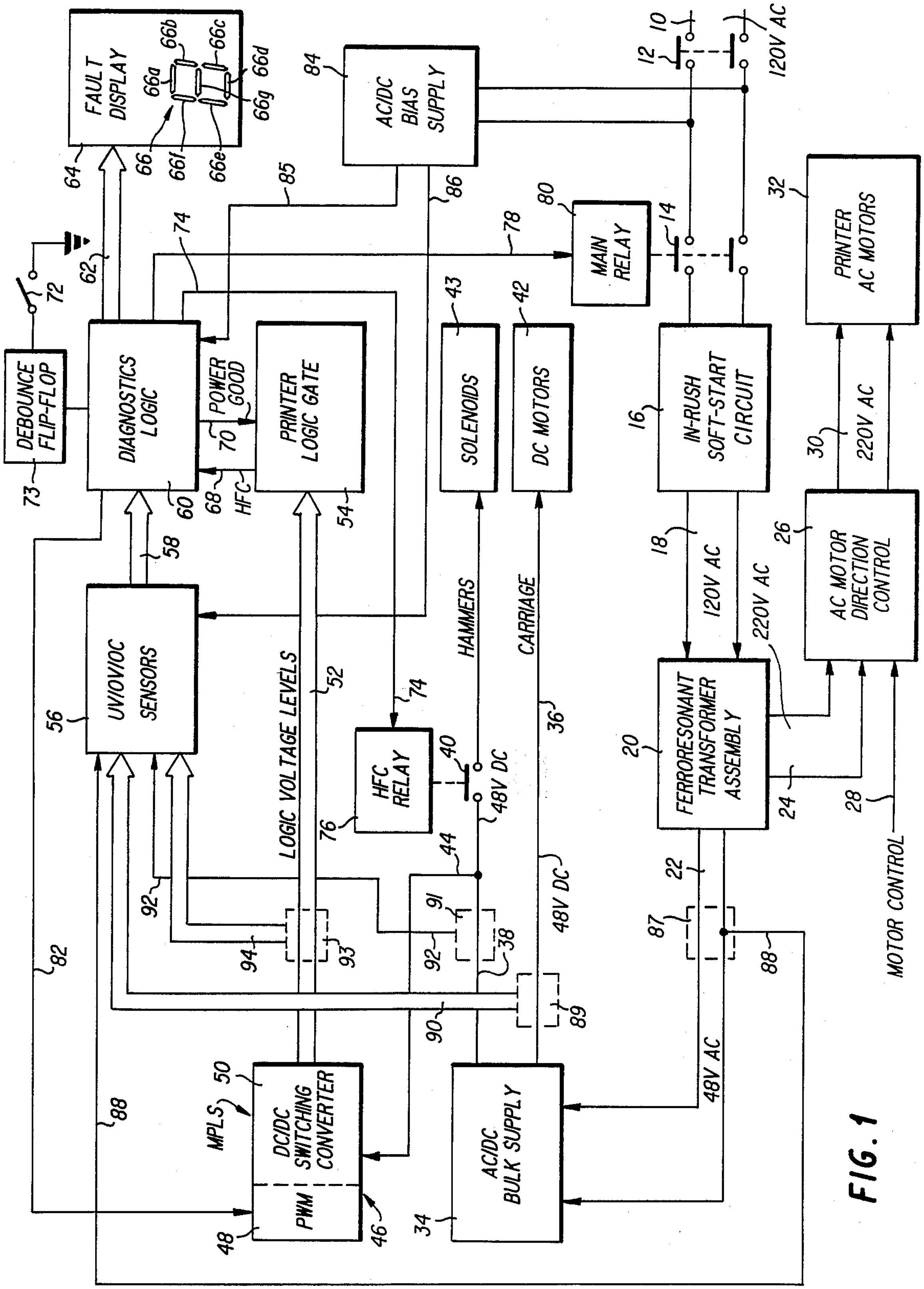
FIG. 1 is a block diagram showing the power supply and fault isolation indicator of the invention.

The invention will be illustrated with reference to a power supply for a printer of a type commonly used with computer systems, and FIG. 1 is a block diagram of such a power supply incorporating the principles of the invention. A 120 volt A.C. line 10, which could also be a 220 volt A.C. line, is connected through a circuit breaker 12 and a main switch 14 controlled by a main relay 80 to a conventional in-rush soft-start circuit 16 which limits surge currents upon start-up. The 120 volts of A.C. power are then applied over lines 18 to a ferroresonant transformer assembly 20 which has a 48 volt A.C. output line 22 and an output line 24 providing 220 volts A.C. to an A.C. motor direction control 26, which, under the control of a motor control signal applied at 28 provides 220 volts A.C. on line 30 to carriage A.C. motors 32 which drive the character bands of the printer.

The 48 volts A.C. on line 22 is applied to an A.C. to D.C. converter or bulk volts power supply 34 which supplies power to the printer's carriage D.C. motors 42 and hammer solenoids 43. A first 48 volts D.C. output line 36 powers the D.C. carriage motor of the printer, while a second 48 volt D.C. output on line 38 supplies power to the printer's hammer solenoids. It is to be noted that line 38 includes a switch 40 controlled by an HFC (hammer fire control) relay 76 which remains open for a time after start-up to avoid random tapping of the hammers.

Line 44 applies the 48 volts D.C. from line 38 to a multiple power level switching converter (MPLS) 46. MPLS 46 includes a pulse width modulator (PWM) 48 and a D.C. to D.C. switching converter 50. PWM 48 may be a Unitrode 1525A pulse width modulator which includes a shutdown pin to which is applied an MPLS shutdown signal on line 82. When this signal is applied, as will be explained more fully hereinafter, the PWM is disabled to shut down MPLS 46. D.C. to D.C. switching converter 50 supplies four logic voltage levels: +5, +8.5, −5 and +12 volts, respectively, on lines 52. These logic voltage levels are applied to a number of cards in printer logic gate 54 which control the operation of the printer. These cards include a carriage control card, a band/ribbon card which controls the ribbon and band motors, an "engine" or CPU card, a disk/OP panel card which contains diskette logic and circuitry associated with the operator controlled panel buttons, a RAM card, a motor driver card for providing the AC motor direction control, a hammer fire control card containing the hammer fire control logic for generating an HFC signal on line 68 to diagnostics logic 60, a hammer driver card containing an analog circuit for the hammer solenoids, a card for a DCA (direct coupling adapter) and a channel control, and a link card providing an interface for the DCA and channel control.

A number of sensors are provided in sensors circuit 56 for monitoring undervoltage, overvoltage and overcurrent conditions at various points in the power supply. Samples of the voltage or current at various points in the power supply system are compared with reference levels in a number of comparators which develop a signal of one logic level to indicate the absence of a fault condition and a signal of a second logic level to indicate that a fault condition is present. These signals are applied by means of a plurality of sense lines 58 to diagnostics logic 60, which will be described in more detailed below. It is among the functions of diagnostic logic 60 to respond to the presence of a fault condition signal of the second logic level on one of the sense lines 58 to generate drive signals on lines 62 to drive a fault display 64 which includes a seven-segment indicator 66 formed, as is typical, of seven LEDs forming the segments *66a, 66b, 66c, 66d, 66e, 66f* and *66g* of the indicator. As will be explained, the indicator 66 will be driven to display a numeral which signifies the sense line on which the fault condition signal appeared and, hence, the point in the power supply system at which the fault condition occurred.

Diagnostics logic 60 includes a start circuit, to be described below, which is initiated by the application of a START signal by closing a start switch 72 connected to diagnostics logic 60 through a debounce flip-flop 73. If it is determined that there are no faults in the power supply system, a POWER GOOD or POWER ON RESET signal is applied at 70 to the RAM logic card, of printer logic gate 54 for 0.5 second after the application of a START signal. The RAM card is inhibited until the POWER GOOD or POWER ON RESET signal appears on lead 70. As will be explained below, diagnostics logic 60 develops a control signal on lead 74 to control HFC relay 76.

In the presence of a fault condition, diagnostics logic 60 generates a SHUTDOWN signal on lead 78 which causes main relay 80 to open switch 14, thereby opening the A.C. power line circuit from line 10. Since the main relay operates relatively slowly, an MPLS SHUTDOWN signal is also applied on lead 82 to the shutdown pin of PWM 48 of MPLS 46 causing rapid shutdown of the MPLS to prevent damage to the MPLS and printer logic gate 54.

It is necessary to provide bias voltages to diagnostics logic 60 and sensors 56 which are not affected by the state of main switch 14. This permits sensors 56 and diagnostics logic 60 to monitor and respond to conditions in the power supply system when switch 14 is open. Thus, AC/DC bias supply 84 is connected on the supply line side of switch 14. Supply 84 provides bias voltages on lead 85 to diagnostics logic 60 and on lead 86 to sensors 56.

In order to supply the monitored voltages and currents to sensors circuit 56, a number of pick off means are used. Pick off 87, which may be a direct connection to line 22, samples the voltage on line 22 and applies the voltage sample on lead 88 to a comparator in sensors circuit 56 which provides a fault signal on one of the sense lines 58 when the voltage output from ferroresonant transformer assembly 20 on line 22 is in an undervoltage condition. Pick off means 89 provides samples of the voltage and current on the 48 volts D.C. line 36 to the printer carriage motor. The voltage sample may be obtained by a direct connection to line 36, while the current sample may be obtained from a resistor in series with line 36 or from a coil coupled to line 36. The samples representing the voltage and current on line 36 are applied on leads 90 to comparators in sensors circuit 56 which provide fault signals on respective lines of sense lines 58 when the voltage on line 36 is undervoltage and when the current is too high. Pick off means 91 provides a sample of the current in hammer voltage supply line 38 on lead 92 to a comparator in sensors circuit 56. This comparator will provide a fault signal on a respective line of sense lines 58 when there is an overcurrent condition in line 38. Since the voltage on lines 36 and 38 come from the same supply 34, a separate undervoltage sensor for hammer line 38 is not necessary.

Pick off means 93 provides samples of the voltages and currents in logic voltage lines 52 via leads 94 to comparators in sensors circuit 56. These comparators generate fault signals on respective lines of sense lines 58 when overcurrent and undervoltage conditions exist on logic voltage lines 52 and an overvoltage condition exists on one of logic voltage lines 52.

Figure 2:
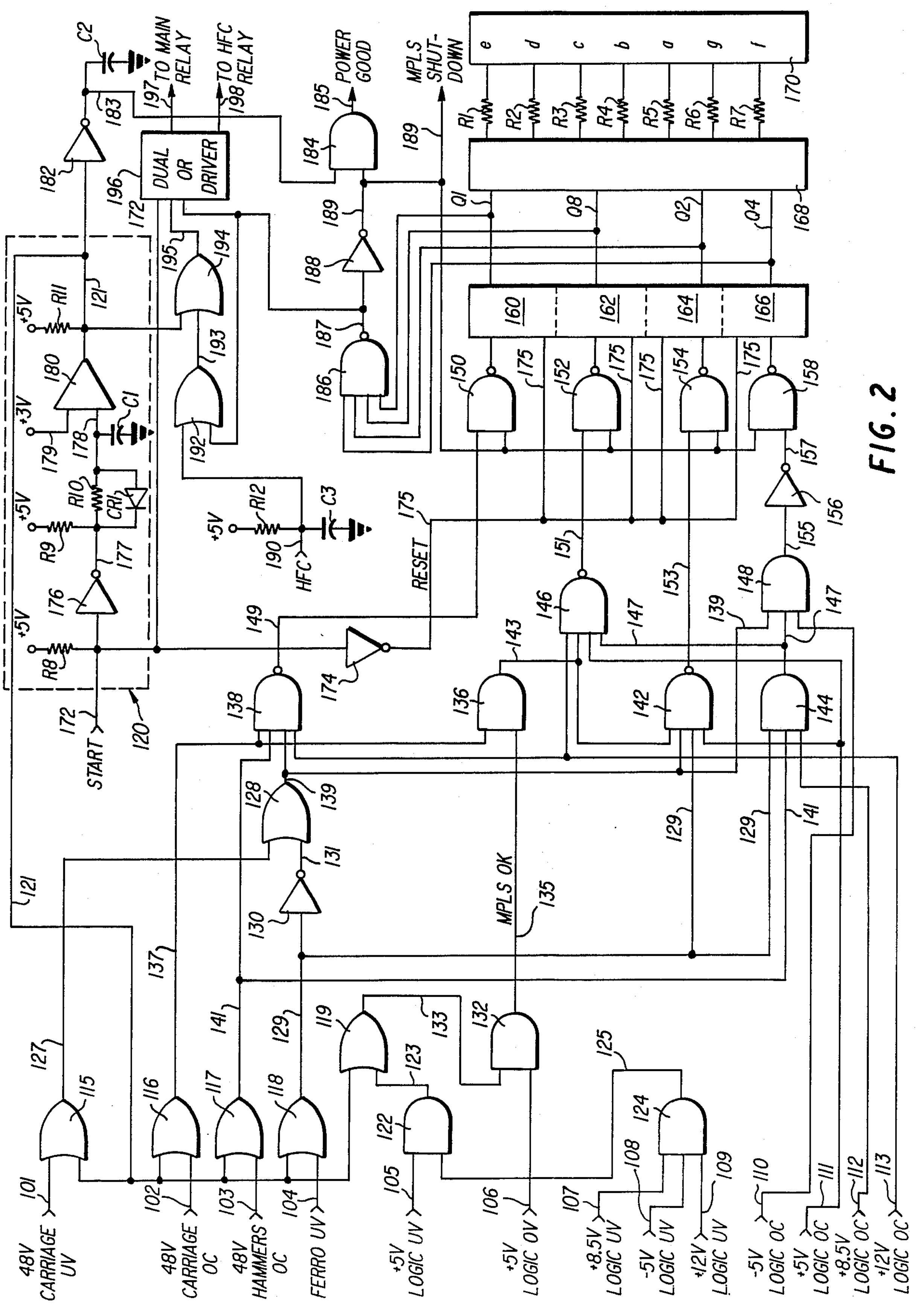
FIG. 2 is circuit schematic diagram showing the diagnostics logic of the system of the invention.

FIG. 2 shows the schematic circuit diagram of diagnostics logic 60, which is rendered with conventional TTL logic. Sense lines 101–113 correspond to sense lines 58. The signals on these sense lines are high in the absence of a fault condition and are pulled low when a fault condition exists at the corresponding point in the power supply system of FIG. 1. Sense line 101 monitors for an undervoltage condition on the 48 volt D.C. carriage line 36, and sense line 102 monitors for an overcurrent condition on line 36. An overcurrent condition on hammer 48 volt D.C. line 38 is monitored on sense line 103. An undervoltage condition on the 48 volt A.C. output line 22 from ferroresonant transformer circuit 20 is sensed on sense line 104. The +5 volt line of logic voltage lines 52 is monitored for undervoltage on sense line 105 and for overvoltage on sense line 106. Undervoltage conditions on the +8.5 volt, −5 volt, and +12 volt logic voltage lines are signaled on sense lines 107, 108 and 109, respectively; and overcurrent conditions on the −5 volt, +5 volt, +8.5 volt and +12 volt logic voltage lines are provided on sense lines 110, 111, 112, and 113, respectively.

Since the undervoltage sensors will provide a false fault condition signal when a START signal initiates operation of the power supply system, a delay circuit to be described below is employed to inhibit response to undervoltage fault conditions until the output voltage levels from the power supply system reach operating levels after start-up. For this purpose five start-up delay OR gates 115, 116, 117, 118 and 119 are provided. A start-up delay circuit 120 provides a high logic level signal on line 121 until the delay period is completed. This signal is applied to one input terminal of OR gates 115, 116, 117, and 118, the other input terminals of which are connected to sense lines 101, 102, 103, and 104. OR gate 119 also receives the delay signal from line 121 on one input terminal. Sense line 105 is connected to an input terminal of AND gate 122, the output 123 from which is connected to the other input to OR gate 119.

Sense lines 107, 108 and 109 are connected to the three inputs of AND gate 124, the output 125 from which is connected to the second input of AND gate 122.

The output 127 from OR gate 115 provides one input to an OR gate 128. The output 129 from OR gate 118 is connected through inverter 130 to the second input 131 of OR gate 128. AND gate 132 has one input connected to sense line 106 and a second input connected to output 133 from OR gate 119. The output 135 from AND gate 132 is labeled MPLS OK, because a high level output from AND gate 132 indicates that all of the logic voltage lines 52 from MPLS 50 are free of undervoltage or overvoltage conditions. This output 135 is applied as one input to AND gate 136, the other input of which receives output 137 from OR gate 116.

It is the purpose of the logic circuit means of diagnostics logic 60, now being described, to convert a fault signal on any of sense lines 101–113 to a BCD signal. In the example shown, the BCD signal is a four digit BCD signal; and the logic circuit includes four logic gates for determining the value of the four BCD digits. One of these BCD digit determining gates is NAND gate 138. The four inputs of NAND gate 138 are received from output 137 from OR gate 116, output 141 from OR gate 117, output 139 from OR gate 128 and sense line 113.

A second of the BCD digit determining gates is NAND gate 142, which has a first input from output 143 of AND gate 136, a second input from output 139 of OR gate 128, a third input from output 129 of OR gate 118, and a fourth input from sense lines 110.

An AND gate 144 has three inputs from output 129 of OR gate 118, output 141 from OR gate 117 and sense line 112. The output 147 from AND gate 144 provides an input to the third BCD digit determining NAND gate 146. The other three inputs to NAND gate 146 are taken from sense line 113, output 143 from AND gate 136, and sense line 111.

AND gate 148, when taken together with inverter 156, constitute the fourth BCD digit determining gate. The three inputs of AND gate 148 are taken from output 139 of OR gate 128, output 147 of AND gate 144, and sense line 110. Inverter 156 receives the output 155 of AND gate 148 and provides an output 157 to a set NAND gate 158, the output from which is connected to a set terminal of a set-reset latch 166. The other input to NAND gate 158 is taken from line 189 from which the MPLS SHUTDOWN signal is applied.

The output 149 from NAND gate 138 is applied as an input to set NAND gate 150, the other input to which is taken from line 189. The output from NAND gate 150 is connected to the set input of set-reset latch 160.

The output 151 of NAND gate 146 is connected to an input of set NAND gate 152, the other input to which is connected to line 189. The output from NAND gate 152 is applied to the set input of a set-reset latch 162.

Output 153 of NAND gate 142 is applied as an input to set NAND gate 154, which also has its second input connected to line 189. The output from NAND gate 154 is connected to the set input of set-reset latch 164.

The outputs Q1 from latch 160, Q2 from latch 164, Q4 from latch 166 and Q8 from latch 162 constitute the four digits of the BCD output of the logic circuit. This BCD signal is applied as an input to a BCD-to-seven-segment-decoder 168 which provides drive signals for the seven-segment fault display 64. These drive signals are applied through 330 ohm resistors R1, R2, R3, R4, R5, R6 and R7 to pins e, d, c, b, a, g and f of a jack 170 which is coupled to display 64 to drive display segments **66*e*, 66*d*, 66*c*, 66*b*, 66*a*, 66*g* and 66*f*** of the seven-segment display.

Start and delay circuit 120 includes a start input terminal 172 which is connected through a 5,000 ohm resistor R8 to a +5 volt bias terminal. Start switch 72 (see FIG. 1), when closed, pulls down start terminal 172. The pulled down signal is applied through inverter 174 and line 175 to the reset terminals of latches 160, 162, 164 and 166 to reset the latches upon the closure of start switch 72.

The delay function of start and delay circuit 120 is initiated when the pulled down start signal is applied through inverter 176 the output 177 of which is connected through 3,000 ohm resistor R9 to the +5 volt bias source and to a time constant circuit formed by a 91,000 ohm resistor R10 and a ten microfarad capacitor C1. Resistor R10 is connected in series between output 177 and one input lead 178 of a comparator 180, the other input lead 179 of which is connected to a +3 volt bias source serving as a reference voltage. Capacitor C1 is connected from lead 178 to ground. The output 177 from inverter 176 goes high upon start-up; and, capacitor C1 begins charging from the +5 volt bias source through resistors R9 and R10 until the charge on capacitor C1 reaches the +3 volt D.C. threshold of comparator 180 causing its output 121, which is connected to the +5 volt bias source through a 10,000 ohm resistor R11, to go low. Due to the time constant of the delay circuit, the high signal on output 121 is delayed 0.5 second and is applied, as explained above, as a delay masking signal to OR gates 115, 116, 117, 118 and 119. A diode CR is connected in parallel with resistor R10 to provide a discharge path to dump the charge on capacitor C1 rapidly when the output 177 from inverter 176 is low to reset the delay circuit for the next turn-on delay.

The low signal on output 121 is also applied through inverter 182 as a high signal on output lead 183 to one input of AND gate 184 from which the POWER GOOD signal will be developed on output 185. A 0.1 microfarad capacitor C2 is connected between lead 183 and ground to provide a 30 microsecond delay in the generation of the POWER GOOD signal, allowing time for the logic circuit means to respond to the undervoltage sensors.

Each of the BCD digits appearing on leads Q1, Q2, Q4 and Q8 provide inputs to NAND gate 186. Since a BCD signal with the value 1111 signifies the absence of a fault condition, the appearance of a fault condition at any of the points in the power supply system being monitored will result in at least one "0" digit on one of the leads Q1, Q2, Q4 and Q8, providing a high output from NAND gate 186 on its output 187. This high signal on output 187 will be applied through inverter 188 as a low signal on a lead 189 connected to the second input of AND gate 184. Thus, the indication of a fault by the BCD signal or the presence of the start delay period will inhibit the generation of the POWER GOOD signal from AND gate 184. Lead 189 provides the MPLS REMOTE SHUT DOWN signal which, as shown in FIG. 1, is applied on lead 82 to PWM 48 of MPLS 46 and is connected to inputs of NAND gates 150, 152, 154 and 158.

An HFC signal generated by the hammer fire control card is applied to HFC terminal 190 which is connected through 5,100 ohm resistor R12 to the +5 volt bias source and through capacitor C3 to ground. Terminal 190 provides one input to OR gate 192, the other input of which is taken from lead 187. Output 193 from OR gate 192 is applied as an input to OR gate 194 whose other input is connected to lead 121. The output 195 from OR gate 194 is applied to one input of dual-OR-driver 196.

Figure 3:
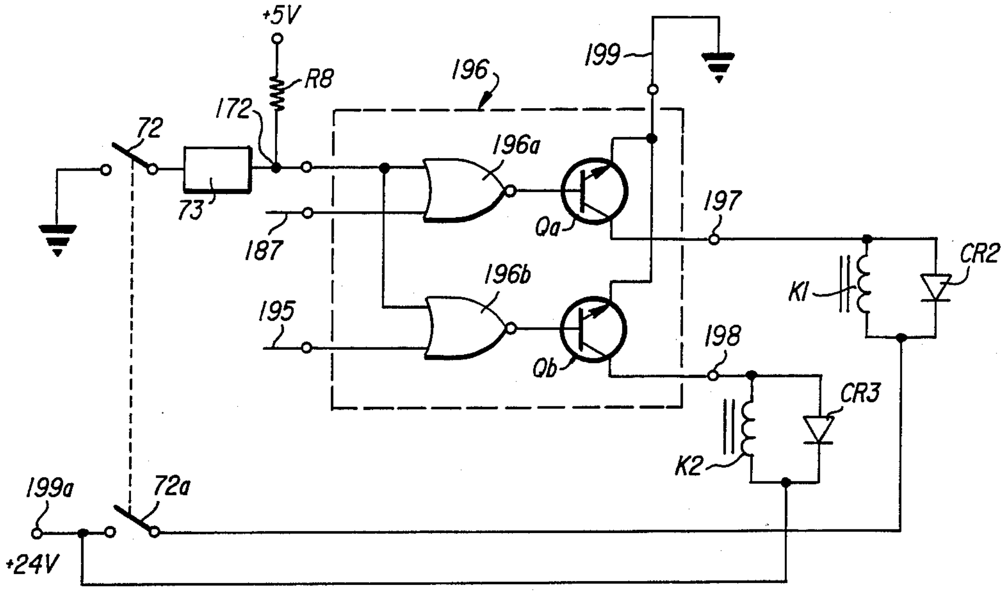
FIG. 3 is a circuit schematic diagram showing details of a dual-OR-drive of the diagnostics logic of FIG. 2 and its relationship with relay coils of the power supply system.

As shown in FIG. 3, dual-OR-driver 196 includes a pair of NOR gates 196*a* and 196*b*. One input of each NOR gate is connected to start terminal 172. The second input to NOR gate 196*a* is connected to lead 187, while output 195 is connected to the second input to NOR gate 196*b*. The output from NOR gate 196*a* is connected to the base electrode of an NPN transistor Qa, the emitter of which is connected to a ground terminal 199. Main relay coil K1, which is in parallel to a reversely biased snubber diode CR2, is connected between the collector of transistor Q2 through terminal 197 to a switch 72*a*, which is ganged to start switch 72 and which, when closed, connected coil K1 to a +24 volt supply terminal 199*a* of bias supply 84. Switch 72*a* insures that circuit of coil K1 is broken whenever start switch 72 is opened. As explained above, start switch 72 is connected to start terminal 172 through debounce flip-flop 73. The output from NOR gate 196*b* is connected to the base electrode of an NPN transistor Qb, whose emitter is connected to ground terminal 199. HFC relay coil K2 is connected between the collector of transistor Qb and +24 volt bias terminal 199*a*; a snubber diode CR3 is reversely biased and connected across coil K2. If both inputs to NOR gate 196*a* are low, transistor Qa will be conductive to complete the circuit of coil K1 causing switch 14 to be closed. If, on the other hand, either or both inputs to NOR gate 196*a* is or are high, transistor Qa will be nonconductive opening the circuit of relay coil K1 and switch 14 will open. Likewise, if both inputs to NOR gate 196*b* are low, transistor Qb will be conductive energizing HFC relay coil K2 and closing switch 40. Thus, when the HFC signal is present on terminal 190, NAND gate 186 indicates no faults and the delay signal on line 21 has terminated, switch 40 will close. If either or both inputs to NOR gate 196*b* are high, transistor Qb will be nonconductive and switch 40 will open.

Figure 4A:
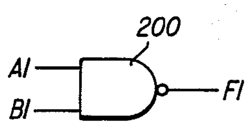
FIG. 4A is a diagram of a NAND gate and a truth table illustrating the operation of the NAND gate.
Figure 4B:
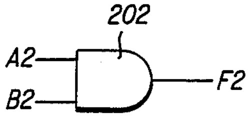
FIG. 4B is a diagram of an AND gate and a truth table illustrating operation of the AND gate.

The operation of NAND and AND gates used in the logic circuitry of diagnostics logic 60 are explained in FIGS. 4A and 4B. NAND gate 200 of FIG. 4A has inputs A1 and B1 and an output F1. As shown in the NAND truth table, where "0" representa a low TTL (ground) level and "1" represents a high TTL (+5 volts D.C.) level, only high signals on both inputs A1 and B1 produce a low signal at output F1. All other combinations of on inputs A1 and B1 result in a high signal on output F1. AND gate 202 of FIG. 4B, on the other hand, provides a high output at F2 only when both inputs A2 and B2 are high. Any other combination of input signals results in a low signal on output F2.

FIG. 7 illustrates the formation and retention of a single digit of the BCD code signal corresponding, in part, with the logic circuit shown in FIG. 2 and will be used in conjunction with the timing diagrams of FIG. 8 to explain this operation. In FIG. 7, NAND gate 138 is one of the BCD digit determining logic gates and receives inputs from sense line 113 and leads 137, 141 and 139 which correspond, respectively, to sense lines 102, 103 and 101. The output on line 149 from NAND gate 138 is applied to set NAND gate 150 which provides a set signal on lead 206 to set-reset latch 162 which consists of two NAND gates 210 and 212. The hold output from NAND gate 210 on lead 211 is applied to one input of NAND gate 212, the output 216 from which provides one BCD digit on lead Q1 and a feedback signal on lead 215 to the second input of NAND gate 210. The second input 213 of NAND gate 212 is the reset input of the latch and, referring again to FIG. 2, is connected to receive the reset signal on lead 175. The BCD digit on lead Q1 is also applied as a feedback to NAND gate 186 along with feedback from each of the other BCD digit lines Q2, Q4 and Q8. The output 187 of NAND gate 186 is applied through inverter 188 and lead 189 as the second input of set NAND gate 150.

Turning now to FIG. 5, a series of timing diagrams illustrate the power-up/down sequence in the absence of any faults. The "start" curve 220 tracks the logic levels of the start signal applied to terminal 172. The "bulk volts" curve 221 shows the voltage levels of the 148 volt D.C. outputs on leads 36 and 38. The "MPLS volts" curve 222 follows the voltage levels on one of the logic voltage lines 52 on the output side of MPLS 46. The "local sense" curve 223 tracks the logic levels on one of the sense lines 58 which monitors for an undervoltage condition. The delay masking function is illustrated by "undervolts delay" curve 224 which shows the logic level on line 121. Curve 225 showns the generation of the POWER GOOD signal.

At time $T_1$, the A.C. line voltage is disconnected, start terminal 172 is high, and the bulk volts and MPLS volts are low. Since the sensor circuits 56 receive bias voltage from bias supply 84, the undervoltage sensors are effective and, as shown by curve 223, the local sense signal is low indicting the undervoltage condition illustrated by curve 222. Undervolts delay curve 224 high, because, before start switch 72 is closed, start terminal 172 is high. The output of inverter 176 is low; and being connected to the negative terminal of comparator 180, the output on line 121 from the comparator is high. This high signal on line 121 keeps the outputs from OR gates 115–119 high, notwithstanding the low sensor signals. As shown by curve 225, the POWER GOOD signal on output 185 is low, because the high signal on lead 121, inverted by inverter 182, is applied as a low signal to AND gate 184.

At time $T_2$, start switch 72 is closed, pulling start terminal 172 to ground and bringing start curve 220 low. This causes the OR gate driver for main relay output 197 to energize main relay 80 and close main switch 14. Shortly after the closing of start switch 72, the voltage from bulk supply 34 of curve 221 begins to rise gradually under the influence of in-rush soft-start circuit 16. At time $T_3$, the voltage curve 222 of MPLS 46 begins to rise gradually as well, lagging curve 221 because MPLS 46 requires 32 volts D.C. from bulk supply 34 to begin producing output voltages. At $T_4$, bulk volts curve 221 reaches its full value after a delay H caused by in-rush soft start circuit 16. At $T_5$, MPLS volts curve 222 reaches its full value. Since the undervoltage sensor will no longer sense an undervoltage condition, local sense curve 223 comes up to it high value. At $T_6$, the undervoltage delay signal on line 121 comes down as the charge on capacitor C1 reaches the voltage level of reference input 179, and the output of comparator 180 comes low. Because the undervoltage delay I extends beyond $T_5$, the undervoltage sensed before $T_5$ is not effective to initiate the fault indicating and main relay opening functions. After a delay J introduced by capacitor C2 to allow time for diagnostics logic 60 to respond to the now unmasked undervoltage monitoring sense signals, the POWER GOOD signal of curve 225 comes up at time $T_7$. Start switch 72 is opened at $T_8$, bringing start curve 220 back to its high level to generate a reset signal on reset lead 175 to reset latches 160, 162, 164 and 166. This also restores the undervoltage delay signal of curve 224. After a brief propagation delay, POWER GOOD signal of curve 225 comes down at $T_9$ in response to the change in level of the delay signal on lead 121 which through inverter 182 provides an input to POWER GOOD AND gate 184. At about the same time, bulk volts curve 221 begins to drop as the capacitors of bulk supply 34 discharge. At $T_{10}$, the MPLS volts of curve 222 begin to come down as its capacitors discharge. At about this time, the undervoltage sensors monitoring ferroresonant transformer circuit 20 and bulk supply 34 sense an undervoltage condition; and local sense curve 223 comes down. Bulk volts curve 221 and MPLS volts curve 222 reach their low value at $T_{11}$, restoring the normal off condition at $T_{12}$.

The power-up/down sequence with the occurrence of a fault is illustrated in FIG. 6, where curve 230 represents the start signal level on start terminal 172; curve 231 tracks a MPLS voltage output on one of the logic voltage leads 52; curve 232 represents the local sense signal on a sense line 58 monitoring for an undervoltage condition on the one logic voltage lead; curve 233 illustrates the latching of a BCD digit by one of latches 160, 162, 164 or 166; curve 234 shows the undervoltage delay signal on lead 121; and curve 235 shows the POWER GOOD signal on POWER GOOD output 185. At time $T_{13}$ with the A.C. line disconnected, start curve 230 is high; MPLS volts curve 231 is low; local sense curve 232 representing the undervoltage condition sensed by the undervoltage sensor is low; the latched BCD code curve 233 is high; undervoltage delay curve 234 is high indicating that the delay signal on line 121 is active; and POWER GOOD line 235 is low. At time $T_{14}$, start switch 72 is closed bringing start terminal 172 and curve 230 low. After a delay K, at time $T_{15}$ the MPLS voltage level curve 231 beings to rise gradually. At time $T_{16}$, the logic voltage level being monitored has risen to the threshold of the undervoltage sensor and is no longer sensed as undervoltage, causing local sense curve 232 to rise to its high level. However, undervoltage delay signal curve 234 is still subject to the undervoltage delay I and remains high until $T_{17}$. Curve 235, responding to the delay introduced by capacitor C2, does not come up until $T_{18}$. As a fault develops, MPLS volts curve 231 beings to fall, reaching the undervoltage threshold of the undervoltage sensor at $T_{19}$. The sensor responds at $T_{20}$, and the local sense 232 falls to its low value indicating the existence of an undervoltage fault condition. This results in the latching of a BCD code digit as shown by curve 233 which comes high at $T_{20a}$. After a propagation delay, this causes the POWER GOOD signal of curve 235 to come low at $T_{21}$. At the same time, dual OR driver 196 deenergizes main relay 80 causing it to begin opening power switch 14. At $T_{22}$, the MPLS shutdown signal on lead 189 has brought the logic voltage level of curve 231 back down to zero; and at $T_{22a}$, main switch 14 disconnects the A.C. line. At $T_{23}$, start switch 72 is opened, bringing start signal curve 230 to its high level and initiating reset of the latch at $T_{23a}$ as shown by curve 233 and restoring the undervoltage delay signal to its high level as shown by curve 234.

FIG. 8, which should be considered with reference to FIG. 7, illustrates fault code retention by the latch. Curve 236 represents the start signal on start terminal 172. Curve 237 follows the level of the sense signal appearing at point A in FIG. 7 on one of inputs 137 or 141 of NAND gate 138, which, as will be noted in FIG. 2, monitor overcurrent conditions in 48 volt carriage line 36 and 48 volt hammer line 38, respectively. Curve 238 shows the level of the BCD decode signal at point B of FIG. 7, and the gate decode signal at point C is followed by curve 239. The set BCD code signal at point D is shown by curve 240, and the hold BCD code signal at point E is illustrated in curve 241. The latched BCD code digit at point G is shown by curve 243, while the reset signal at point F is followed by curve 242.

At time $T_{24}$, start switch 72 is closed, bringing the start signal on terminal 172 and curve 236 low. The reset signal shown by curve 242, which was low, resetting the latches, when switch 72 was closed at $T_{24}$, is brought high at $T_{25}$ due to the propagation delay through inverter 174. An overcurrent fault occurs at $T_{26}$, and sense signal A goes low. This causes BCD decode signal B to come high at $T_{27}$, because NAND gate 138 has a "0" on one of its inputs as shown in FIG. 4A. Since gate decode signal C (see curve 239) is also high at this time, NAND gate 150 set output D is brought low at $T_{28}$ as shown by curve 240. One of the inputs to NAND gate 210 now being low, the hold output E is brought high at $T_{29}$ as shown by curve 241. Since reset signal F, as shown by curve 242, is also high, NAND gate 212 output G comes low at $T_{30}$, providing a BCD digit Q1 on lead 216. Since this low output G is fed back on lead 215 to the other input to NAND gate 210, the output E of NAND gate 210 is held high, latching the BCD digit Q1 on lead 216 until reset signal F comes low on reset. The latched output G is also fed back as the Q1 input to NAND gate 186, bringing its output 187 high and the gate output C of inverter 188 low at $T_{31}$ as shown by curve 239. When C comes low, the output D of NAND gate 150 will come high at $T_{32}$. At $T_{32}$ also, dual-OR-driver 196 transistor Qa becomes nonconductive to open the circuit of main relay coil K1. Due to the time required for main relay 80 to operate, switch 14 opens at $T_{33}$. Since this opens the A.C. line, the overcurrent condition terminates and sense curve 237 riese to its high level at $T_{33}$. With the sense signal A at the input to NAND gate 138 now high, BCD decode signal B becomes low at $T_{34}$.

If start switch 72 is now opened at $T_{35}$, the start signal on terminal 172 comes up as shown by curve 236. Reset curve 242 falls at $T_{36}$ to reset latches 160, 162, 164 and 166 which brings latched code signal G high at $T_{37}$. This brings the signal on the input from line 215 of NAND gate 210 high, and brings the hold BCD output E from NAND gate 210 low at $T_{38}$. Since the Q1 input to NAND gate 186 is now high, the output from NAND gate 186 becomes low and the gate output signal C goes high at $T_{39}$.

The relationship between the BCD code and the fault numeral displayed is shown in Table I:

TABLE I

| Fault Display | BCD Code | Fault |
|---|---|---|
| 0 | 0000 | Ferroresonant, bulk and MPLS all UV |
| 1 | 0001 | Ferroresonant collapsed UV |
| 2 | 0010 | +48 V.D.C. hammer load OC |
| 3 | 0011 | +8.5 V. logic load OC |
| 4 | 0100 | +48 V.D.C. carriage motor OC |
| 5 | 0101 | MPLS Logic voltage UV or OV |
| 6 | 0110 | +12 V.D.C. logic load OC |
| 7 | 0111 | +5 V.D.C. logic load OC |

TABLE I-continued

| Fault Display | BCD Code | Fault |
|---|---|---|
| 8 | 1000 | +48 V.D.C. bulk supply UV |
| 9 | 1001 | −5 V.D.C. logic load OC |
| Blank | 1111 | No faults exist |

The fault display is used for diagnosing a fault in the power supply system. Fault display "0" could be caused by the absence of A.C. voltage to the primary circuit of the ferroresonant transformer assembly 20 during powering up. This could be caused by a blown A.C. power line fuse, an inoperative in-rush relay, an inoperative main contactor or an open in the primary of the ferroresonant transformer assembly.

Fault display "1" indicates that after the power is up and operating, the ferroresonant transformer assembly has failed with an undervoltage condition. This could be caused by a collapsed ferroresonant transformer due to a shorted bulk 48 volt D.C. load, a collapsed ferroresonant transformer due to a failing capacitor in ferroresonant transformer assembly 20, or an open in the primary or secondary coil of the ferroresonant transformer.

When "2" is displayed, the 48 volt D.C. hammer load is overcurrent during power up or operation. The trouble may be located in the hammer solenoid or solenoid circuit itself or in the hammer driver control card.

When "3" is displayed, the 8.5 volt D.C. logic load is overcurrent during power up or operation. This may be caused by a fault in the DCA and channel control card.

The display "4" indicates that the 48 volt D.C. carriage motor load is overcurrent during power up or operation.

If "5" is displayed, MPLS supply 46 has had an overvoltage or undervoltage failure during power up or operation. The undervoltage failure could be caused by the failure of a component in the MPLS supply, such as an open secondary diode. The overvoltage condition could be brought on by a short circuit between two of the output voltage leads 52. As has been mentioned, information from sense lines 105, 107, 108 and 109, which monitor logic voltage lines 52 for undervoltage conditions, and from sense line 106, which monitors the +5 volt logic voltage line for overvoltage, have been bunched through the use of AND gates 124 and 132. Since an overvoltage condition in the +5 volt logic voltage line will cause overvoltage conditions on the other logic voltage lines, it is not necessary to monitor all of the logic voltage lines for overvoltage. The operator could check eachof the logic voltage lines individually to locate the source of the fault signal.

When "6" is displayed, the 12 volt D.C. logic load is overcurrent during power up or operation. This fault possibly originates in the band/ribbon card or the disk/OP panel card which use the 12 volt logic voltage.

If, during power up, the +5 volt D.C. logic load is overcurrent, a "7" is displayed. Since all of the printer logic cards of printer logic gate 54 use the +5 volt logic voltage, the fault may originate in any of these cards. The operator will then find the card at fault by removing cards and plugging substitute cards in order until the fault is corrected.

When "8" is displayed, the bulk 48 volt D.C. supply 34 has had an undervoltage failure. This could be caused by shorted or open rectifying diodes, shorted or open filter capacitors, or shorted bleed resistors.

When "9" is displayed, the −5 volt D.C. logic load is overcurrent during power up or operation. This trouble may originate in the motor drive card, the hammer fire control card or the DCA and channel card, which use the −5 volt logic voltage. Again, the operator may try substitute card until the faulty card is located.

A blank display signifies that power is down or that the system is operating without any faults.

The disclosed embodiment uses a four-digit BCD code in order to keep down the cost of diagnostics logic 60. By using a more costly five-digit BCD code system, the diagnostics logic will be able to provide a greater number of fault indicating numerals. Additional sense lines could be added to provide specific information as to the fault status of individual logic cards.

The diagnostics logic of the invention can be implemented with logic components which are readily available at reasonable cost from vendors. For example, one implementation of the disclosed embodiment of the invention has used a 74LS11 3-3W AND gate unit for AND gates 124, 144 and 148 and a 74LS08 4-2W AND gate unit for AND gates 122, 132, 136 and 184. Three 74LS32 4-2W OR gate units supplied OR gates 115–119, 128, 192 and 194. NAND gates 138, 142, 146 and 186 were implemented by a pair of 74LS20 2-4W NAND gate units, while NAND gates 150, 152, 154 and 158 were provided by 74LS00 4-2W NAND gate units. The six inverters 130, 156, 174, 176, 182 and 188 were made available by a 74LS04 HEX inverter unit. For set-reset latches 160, 162, 164 and 166, a single 74LS279 4-SR latch unit was used. A UND5713 Dual-OR-Driver was employed as dual-OR-driver 196, and a 74LS47 BCD-7 Segment Decoder was used as decoder 168. For fault display 64, a HP5082-7610 7-segment display unit was employed. This system was considerably less expensive than systems using microprocessors or custom designed PROMs.

While the invention has been particularly shown and described with reference to a preferred emodiment, it will be understood by those skilled in the art that changes in form and details may be made therein without departing from the spirit and scope of the invention. As mentioned above, the invention need not be limited to monitoring undervoltage, overvoltage and overcurrent conditions, but could also monitor other conditions in a power supply system, such as thermal conditions.

What is claimed is:

1. A power control and fault isolation indicator, comprising:

means for sensing conditions in output lines from voltage source sections of a power supply system, said means for sensing including a plurality of sense lines, each corresponding to a point on one of said output lines, one logic level on a sense line representing a normal condition at said corresponding point and a second logic level on a sense line representing a fault condition at said corresponding point;

first logic circuit means connected to said sense lines and responsive to said second logic level on one of said sense lines for generating a code signal representing said corresponding point at which said fault condition occurred, and including storage means having output terminals for storing said code signal, said code signal appearing as a particular pattern of logic levels on a plurality of code lines connected from said output terminals;

second logic circuit means connected to receive inputs from said code lines and responsive to said code signal when said code signal signifies a fault condition at one of said points to generate at least a first shutdown signal;

means in said power supply system responsive to said first shutdown signal for shutting down said power system; and indicating means responsive to said code signal on said code lines for indicating said point at which said fault condition occurred.

2. A power control and fault isolation indicator as recited in claim 1, wherein said storage means comprises a plurality of latch means for storing said code signal, said code lines receiving outputs from respective latch means.

3. A power control and fault isolation indicator as recited in claim 1, wherein said fault condition signified on at least one of said sense lines is an undervoltage condition, and wherein said power supply system includes start means and delay means responsive to said start means, said first logic circuit means being masked by said delay means to prevent generation of said code signal in response to said undervoltage condition, said delay means providing time for the voltage levels in said power supply system to reach normal levels after start-up.

4. A power control and fault isolation indicator as recited in claim 3, wherein said fault conditions signified on others of said sense lines include overvoltage and overcurrent conditions.

5. A power control and fault isolation indicator as recited in claim 1, wherein said code signal is a BCD code signal.

6. A power control and fault isolation indicator as recited in claim 5, wherein said indicating means includes means for converting said BCD code signal to a seven segment indicator drive signal and a seven-segment display driven by said drive signal to display indicia representing said point at which said fault condition occurred.

7. A power control and fault isolation indicator as recited in claim 5 wherein said BCD code signal comprises a plurality of binary digits, each binary digit corresponding to the logic level on one of said code lines, said plurality of binary digits having an initial value in the absence of said second logic level on all of said sense lines, and wherein said first logic circuit means responds to said second logic level on one of said sense lines to change the value of one or more of said plurality of binary digits to a fault value so that said BCD code signal has a value corresponding to a decimal number value signifying that a fault condition occurred at a said point corresponding to said one of said sense lines.

8. A power supply and fault isolation as recited in claim 7, wherein at least one of said BCD code signal values signifies that said second logic level appeared on any one of a set of said sense lines.

9. A power supply and fault isolation indicator as recited in claim 7, wherein said storage means comprises means for latching said BCD digits, said second logic circuit means and said indicating means being responsive to said code signal stored in said latch means.

10. A power supply and fault isolation indicator as recited in claim 9, wherein said first logic circuit means further comprises, for each said BCD digit, a first logic gate for generating a BCD digit output signal of said fault value in response to said second value appearing on a corresponding sense line, a first NAND gate having one input receiving said BCD digit output signal and a second input, said first NAND gate generating a set signal, said latch means comprising a second NAND gate and a third NAND gate, said second NAND gate having a first input receiving said set signal from said first NAND gate and a second input, said second NAND gate generating a hold signal, said third NAND gate having a first input receiving said hold signal from said second NAND gate and a second input, said third NAND gate latching one of said BCD digits, said second logic circuit means comprising a second logic gate having a plurality of inputs, one being connected to receive said one of said latched BCD digits and the remaining imputs being connected to receive the remaining of said BCD digits said second logic gate generating a gate signal connected to said second input of said first NAND gate, said second input of said second NAND gate being connected to the output of said third NAND gate to receive said one of said latched BCD digits, and said second input of said third NAND gate being connected to receive a reset signal.

11. A power supply and fault isolation indicator as recited in claim 10, wherein said power supply system includes start means and reset means responsive to said start means for applying said reset signal to said second input of said third NAND gate to reset said latch means when said power supply system is turned on by said start means.

12. A power supply and fault isolation indicator as recited in claim 1, wherein said second logic circuit means generate two shutdown signals when said code signal signifies a fault condition at one or said points and said means in said power supply system responsive to said first shutdown signal includes a main relay controlling a main switch connecting said power supply system to an A.C. power line, said main relay responding to said first shutdown signal to open said main switch, and said power supply system comprising converter means including a pulse width modulator, and means applying said second shutdown signal to said pulse width modulator and converter means.

* * * * *

UNITED STATES PATENT AND TRADEMARK OFFICE
CERTIFICATE OF CORRECTION

PATENT NO. : 4,803,592

DATED : Feb. 7, 1989

INVENTOR(S) : Donald J. Ashley

It is certified that error appears in the above-identified patent and that said Letters Patent is hereby corrected as shown below:

Column 1, line 37, change "sifting" to -- shifting --.

Column 2, line 10, change "donot" to -- do not --.

Column 9, line 15, change "Q2 to -- Qa --.

Column 9, line 17, change "connected" to -- connects --.

Column 9, line 19, after "that" insert -- the --.

Column 14, line 6, change "card" to -- cards --.

Column 16, line 28, after "digits" insert -- , --.

Signed and Sealed this

Third Day of October, 1989

*Attest:*

DONALD J. QUIGG

*Attesting Officer* *Commissioner of Patents and Trademarks*